(12) United States Patent
Longmore

(10) Patent No.: US 12,143,280 B1
(45) Date of Patent: Nov. 12, 2024

(54) CONSTRAINT MANAGEMENT FOR NETWORK-BASED SERVICE ACTIONS

(71) Applicant: Amazon Technologies, Inc., Seattle, WA (US)

(72) Inventor: Juan-Pierre Longmore, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/459,177

(22) Filed: Aug. 31, 2023

(51) Int. Cl.
*G06F 15/16* (2006.01)
*H04L 41/5003* (2022.01)
*H04L 67/51* (2022.01)

(52) U.S. Cl.
CPC .......... *H04L 41/5003* (2013.01); *H04L 67/51* (2022.05)

(58) Field of Classification Search
CPC ............................ H04L 41/5003; H04L 67/51
USPC ......................................................... 709/223
See application file for complete search history.

(56) References Cited

U.S. PATENT DOCUMENTS

| | | | | |
|---|---|---|---|---|
| 8,902,787 B2 * | 12/2014 | Qiu | ................... | H04L 41/0853 370/254 |
| 9,361,153 B2 * | 6/2016 | Makino | ................. | G06F 9/4881 |
| 9,838,257 B2 * | 12/2017 | Lee | ..................... | H04L 41/0816 |
| 10,409,783 B1 * | 9/2019 | Miller | ....................... | H04L 9/50 |
| 10,779,132 B2 * | 9/2020 | Watanabe | .............. | H04M 11/00 |
| 10,902,152 B2 * | 1/2021 | Diekmann | ............ | G06F 21/604 |
| 11,645,711 B2 * | 5/2023 | Anasta | ..................... | G06N 3/08 705/38 |
| 2013/0205370 A1 * | 8/2013 | Kalgi | .................... | G06F 21/316 726/3 |
| 2014/0280805 A1 * | 9/2014 | Sawalha | ............... | G06F 9/5072 709/222 |
| 2017/0332216 A1 * | 11/2017 | Watanabe | ............... | H04W 4/12 |
| 2021/0103671 A1 * | 4/2021 | Diekmann | ............. | G06F 21/31 |
| 2022/0383406 A1 * | 12/2022 | Anasta | ................. | G06Q 20/405 |
| 2024/0205571 A1 * | 6/2024 | Pal | ..................... | H04L 41/0853 |

OTHER PUBLICATIONS

Anonymous, "Use service account impersonation", Google, Aug. 1, 2023, in 5 pages.

* cited by examiner

*Primary Examiner* — Moustafa M Meky
(74) *Attorney, Agent, or Firm* — Knobbe, Martens, Olson & Bear, LLP

(57) ABSTRACT

Systems and methods are provided for bypassing or enforcing constraints regarding actions on network-based services. An account manager can store or maintain an account type of standard or special as account information associated with an account. When a user operating under an account tries to perform an action on a network-based service, the network-based service may retrieve or receive the account type associated with the account from the account manager. If the account type is standard, the network-based service can enforce constraints on the action. Alternatively, if the account type is special, the network-based service can bypass constraints on the action.

20 Claims, 7 Drawing Sheets

CONSTRAINT MANAGEMENT FOR NETWORK-BASED SERVICE ACTIONS

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
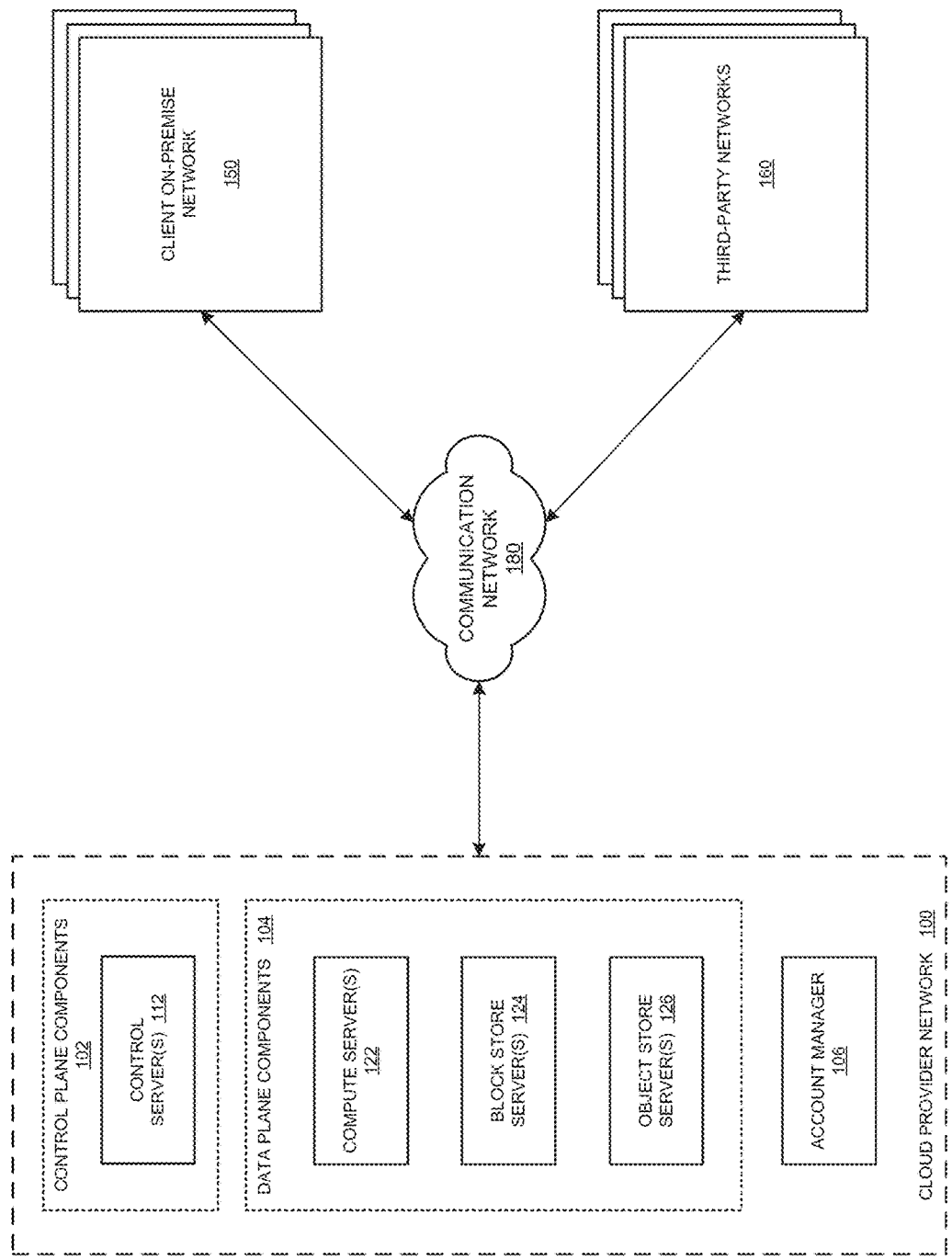
FIG. 1 is a block diagram depicting an illustrative network environment in which constraint management for network-based service actions may be implemented according to some embodiments.

Generally described, the present disclosure relates to (i) management of different types of accounts for use of network-based services, and (ii) the network-based services selectively enforcing, adding, or relaxing constraints on actions based on the type of account initiating the actions. Advantageously, by enforcing, adding, or relaxing constraints based on the type of account initiating actions, network-based services can allow for more efficient testing, deployment, rollback, etc., for networks, systems, and individual objects when desired, without affecting or risking networks, systems, and individual objects for which it is desired to enforce constraints.

An account management system (also referred to herein as an account manager) may receive a request to create an account assigned to one of a plurality of different account types (e.g., a standard account type or a special account type). The account manager may create the account and store account data representing the account type to which the account was assigned. The account manager may then provide the account data or another indicator of the account type to network-based services such that the network-based services can determine on an action-by-action basis whether to apply constraints on actions initiated by or on behalf of the account. For example, the user may attempt to perform an action (e.g., delete a storage object) on a network-based service. The action may be associated with one or more constraints on performance of the action, such as prerequisites that are to be satisfied or performed before the action may be performed. The network-based service may receive or retrieve from the account manager the indicator of the account type of account associated with the user. If the account type is designated as a particular type, such as a "standard account type" or "production account type," the network-based service may apply constraints which may need to be satisfied before the action is completed or executed. For example, accounts of a production account type may be subject to data object constraints for mitigation of negative impacts to production workloads from inadvertent actions taken on resources associated with the particular account. If the account type is designated as "special account type" or "test account type," the network-based service may selectively bypass or forego the constraints on the action. As described below in more detail, bypassing standard constraints (e.g., in a production environment) can provide benefits such as allowing rapid deployment, testing, and teardown of a network-based environment or portions thereof (e.g., ensuring builds work before full deployment). Moreover, for account types that are designated as "special," the network-based services may apply constraints to actions which are not applied to account types designated as "standard."

Some conventional network-based services apply constraints on actions for various reasons. For example, a network-based object storage service may apply constraints for deletion requests of storage units (e.g., buckets) which store multiple objects. In this example, to protect against inadvertently deleting storage objects in a bucket, the network-based object storage service may apply a constraint that does not allow a deletion of the bucket if the bucket contains any storage objects. In another example, a network-based object storage service may apply a "cool-down" constraint for recreation of a storage unit having the same name as a storage unit that has been deleted. In this example, to protect against malicious actors or unexpected behavior when accessing a storage unit, names may not be re-used until a period of time has passed (e.g., hours, days, etc.) since a storage unit having the same name was deleted. In another example, some network-based services may apply deletion throttling constraints. In this example, there may be an auditing throttling constraint that disallows deletion of certain information because of auditing reasons (e.g., a company must retain business records for seven years per IRS requirements). However, in some cases, users (e.g., employees of the network-based services, external customers that pay for services, etc.) of network-based services may find these, and other constraints, problematic. For example, employees of network-based services may want to perform builds of regions in a production environment for testing purposes to ensure all services (e.g., object based storage, analytics, artificial intelligence (AI), on-demand code execution, etc.) can properly function after code changes or other modifications. Then the user may choose to tear down such a build and then rebuild it up quickly again to test additional code changes, parameter changes, or the like. Therefore, in this example, at least the storage and auditing constraints described above may hinder the speed at which this process completes or finishes. Additionally, some users (e.g., customers paying for per-use services) of network-based services may want to test use of the services (e.g., by creating an account for object-based storage and ensuring all functionality works) prior to implementing a production system. In this example, if the external customer deletes an object associated with their test build in a production environment they may not be able to create another object with the same name, and same build, for a period of time due to constraints.

Some aspects of the present disclosure address some or all of the issues noted above, among others, by (i) providing an account manager to create and manage different account types (e.g., standard or special) of network-based services users and (ii) enabling network-based services to selectively apply constraints on actions based on account type.

Account type, and derivatives of such, as used in this disclosure are different from access or authority accounts such as administrator and super user accounts. Access or authority accounts provide a level of access a user can have in a system, such as a network-based service. For example, access accounts can describe what pages a user has access to (e.g., user can access marketing data but not payroll data, or user has read-only access to a general ledger accounting page but has write/modification access to a cash settlement treasury page). In contrast, as described herein, account type, and its derivatives, describes a property of an account that controls whether constraints apply on actions for users regardless of their access type (e.g., regardless of whether a user is an administrator or non-administrator). For example, an administer and non-administrator may have access to the same network-based service, but according to different access levels (e.g., administrator can modify/write to any object or record in any storage unit of the service, but the non-administrator can modify/write to only a subset of objects or records in a subset of storage units of the service). However, when deleting storage units from the network-based service, both the administrator and non-administrator can be subject to the same constraints regarding storage unit creation, modification, and deletion (e.g., the same requirement to fully empty a storage unit before it may be deleted, the same "cool-down" or wait time to create a storage unit or data object after a storage unit or data object with same name was deleted, etc.).

The account manager can allow a user of a network-based service to designate an account assigned to—or otherwise associated with—a particular account type (e.g., standard or special). For example, when a user (e.g., employee of network-based service, paying customer, etc.) creates an account with the account manager, the user may designate the account type as standard (e.g., having normal constraints on actions) or special (e.g., selectively bypassing such constraints or adding constraints on actions) based at least on how the user wants to use the account. In another example, after an account with an account type is created, a user may attempt to perform an action on a network-based service, and the account manager may communicate to the network-based service the account type of the account associated with the user. In this example, the account manager can communicate the account and account type to the network-based service so that the network-based service may determine whether to enforce constraints on the requested action by the user.

Additional aspects of the present disclosure relate to network-based services bypassing or relaxing constraints on actions based on accounts being an account type of "special," "test," or another designated non-standard moniker. For example, during creation of a data object on a network-based service (e.g., an object-based storage bucket), the network-based service may determine (e.g., from a communication from the account manager) that the account type of the account is "special." In this example, the network-based service may bypass constraints during creation (e.g., no limit on number of storage buckets created, can have the same bucket name as a recently-deleted bucket, etc.) of the bucket. In another example, during deletion of a data object on a network-based service and after determining (e.g., from a communication from the account manager) that the account type of the account is special, the network-based service may bypass deletion constraints to allow quicker deletion than if the constraints were in place (e.g., no audit constraints to retain data, no deletion quota for a period of time, etc.). In yet another example, during an action on a network-based service (e.g., creating greater than a threshold quantity of empty storage buckets in a network-based object-based storage service), the network-based service may determine the account type associated with the account requesting that action is special and allow the action whereas if the account type was standard such action may not be allowed (e.g., standard accounts may only allow creation up to the threshold quantity of storage buckets at one time and at least one storage object is required in each bucket).

Further aspects of the present disclosure relate to network-based services enforcing constraints on actions based on accounts being an account type of "standard," "production," or another non-special moniker. For example, during creation of a data object on a network-based service, the network-based service may determine (e.g., from a communication from the account manager) that the account type of the account is standard. In this example, the network-based service may enforce constraints during creation (e.g., require a "cool-down" waiting period after deletion of an object with a particular global name before creating a new object with the same global name, etc.). In another example, during deletion of a data object on a network-based service and after determining (e.g., from a communication from the account manager) that the account type of the account is standard, the network-based service may enforce deletion constraints which can add more time and more steps to the deletion (e.g., check with all services provisioned to see if they have certain deletion constraints, explicit acknowledgement to the resource provisioning service to delete the data objects, multi-user confirmation of deletion of the data objects, etc.). In yet another example, during an action on a network-based service (e.g., attempting to create greater than a threshold quantity of empty storage buckets in a network-based object-based storage service), the network-based service may determine the account type associated with the account requesting that action is standard and not allow the action (e.g., standard accounts allow up to a threshold quantity of storage buckets to be created at one time and so an action of creating greater than the threshold quantity of buckets would fail).

Various aspects of the disclosure will now be described with regard to certain examples and embodiments, which are intended to illustrate but not limit the disclosure. Although aspects of some embodiments described in the disclosure will focus, for the purpose of illustration, on particular examples of an account manager, account types, and constraints enforced or bypassed by network-based services, the examples are illustrative only and are not intended to be limiting. Any feature used in any embodiment described herein may be used in any combination with any other feature, without limitation.

Overview of Example Computer Environment

With reference to an illustrative embodiment, FIG. 1 shows an example network environment in which features of the present disclosure may be implemented. As shown, the computing environment includes a cloud provider network substrate 100 (also referred to herein as a "cloud provider network," "provider network," "cloud provider system", or simply as a "cloud" for convenience), any number of client on-premise networks 150 (also referred to herein simply as "on-premise networks" for convenience) external to the cloud provider network 100, and any number of third-party networks 160 external to the cloud provider network 100. The cloud provider network 100, on-premise networks 150, and third-party networks 160 may communicate with each over via a communication network 180, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of central processor units ("CPUs") and graphics processing unites ("GPUs"), optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their clients or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premise networks (as well as their networks hosted on the cloud provider network) to one another.

Clients can connect to availability zones of the cloud provider network via a publicly accessible network (e.g., the Internet, a cellular communication network). Transit Centers ("TC") are the primary backbone locations linking clients to the cloud provider network, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premise and which can use in-region resources to run various parts of the network. Clients can connect their premises to one another using the disclosed cloud WAN service via TCs, cloud-provided cellular networks, and/or edge locations.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a client network that hosts client resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 100 (e.g., computing instances, containers, block storage volumes, databases, file storage, etc., as described in greater detail below). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

Figure 7:
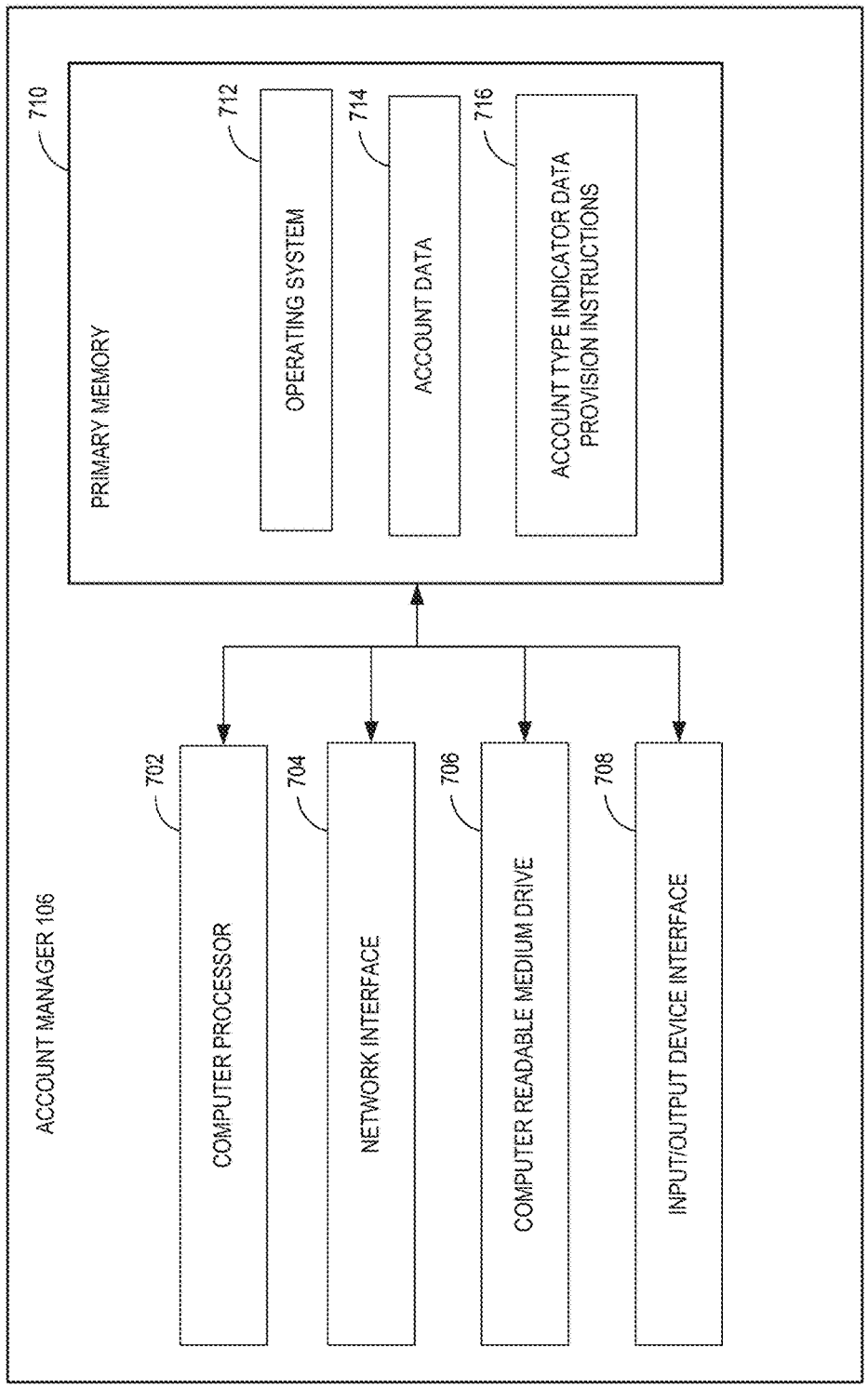
FIG. 7 is a block diagram of an illustrative account manager configured to implement features of some embodiments.

In some embodiments, the cloud provider network may include an account manager 106 configured to implement aspects of the present disclosure for managing accounts and corresponding account types, and for signaling account types to network-based services such as those running on data plane components 104. An account manager 106 may be implemented on a computing device (e.g., server) or set of devices separate from storage servers and compute servers of the data plane 104. In some embodiments, an account manager 106 may share one or more virtualized servers with storage or compute servers. In some embodiments, account managers 106 or certain modules or components thereof may be part of the control plane such that they are control plane components 102. An example account manager 106 is shown in FIG. 7 and described in greater detail below.

Some clients may desire to use the resources and services of the cloud provider network 100, but for various reasons (e.g., latency in communications with client devices, legal compliance, security, or other reasons) prefer for these resources and services to be provisioned within their own network, for example on premises of the client. A piece of the cloud provider network—referred to herein as a "provider substrate extension" or PSE—may be provisioned within the client's on-premise network 150. A client may access their PSE via the cloud provider network 100 or their own network, and may use the same APIs to create and manage resources in the PSE as they would use to create and manage resources in the cloud provider network 100 region.

The PSE may be pre-configured, e.g., by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the client network. As described above, the cloud provider network 100 may offer a set of predefined instance types, each having varying types and quantities of underlying hardware resources. Each instance type may also be offered in various sizes. In order to enable clients to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to client devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a client workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a client or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the client who owns the premises (and any other accounts allowed by the client). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with client resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to client devices and/or workloads.

Figure 2:
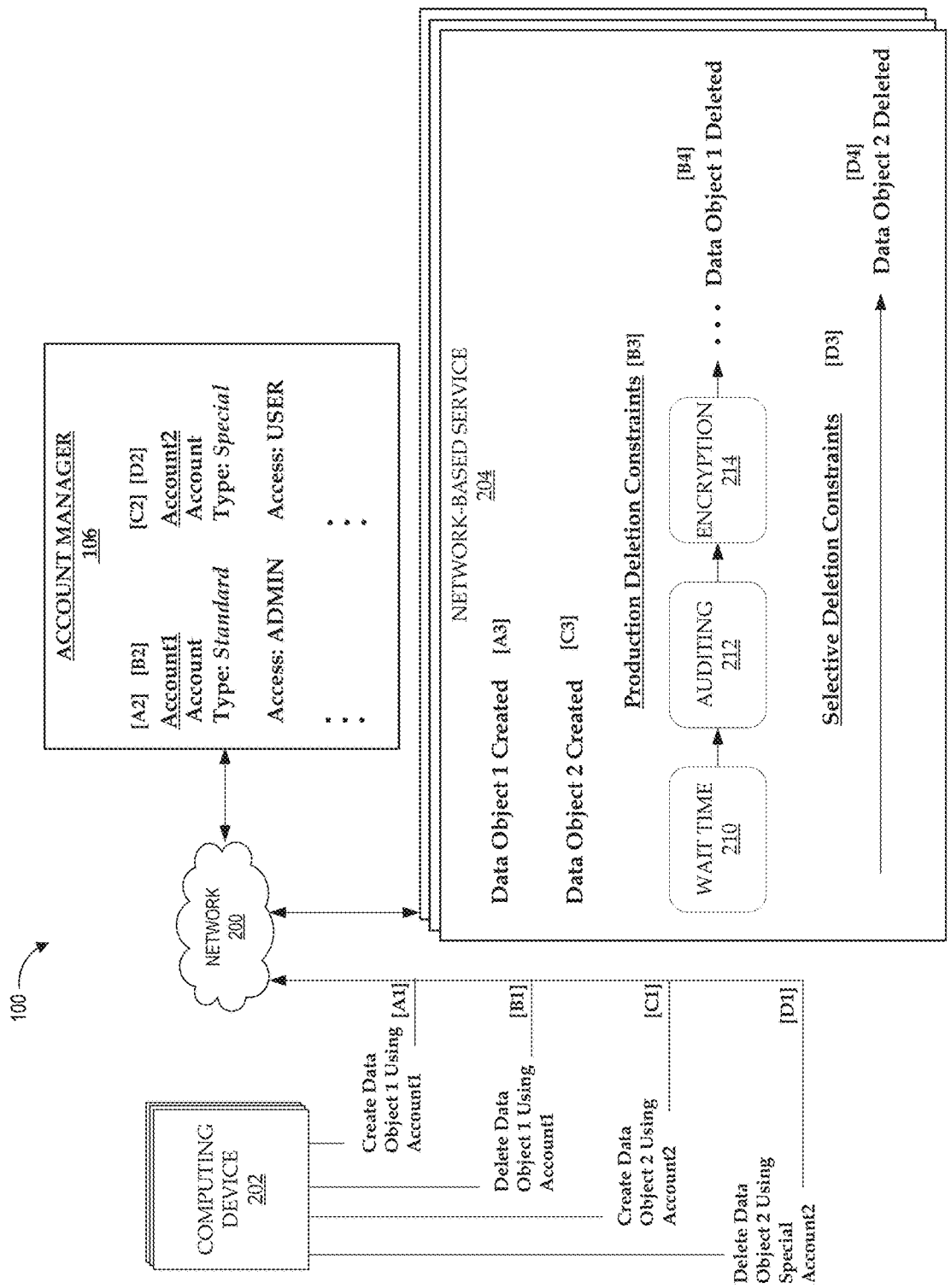
FIG. 2 is a block diagram depicting a high-level technical architecture of a network environment in which an account manager and network-based services may be implemented according to some embodiments.

With reference to FIG. 2, example operations of an account manager 106, computing device 202, and network-based service 204 are illustrated. The network 200 may be the substrate network of the cloud provider network 100. The network-based service 204 may include various services such as block storage services (e.g., implemented using block store servers 124), object storage services (e.g., implemented using object store servers 126), compute services (implemented using compute servers 122), other services, or any combination thereof.

A user of a computing device 202 may seek to perform actions on the network-based service 204. The computing device 202 may be compute servers 122 of the cloud provider network 100, computing devices on a client on-premise network 150, or some other computing device that may initiate an action at a network-based service 204. In general, the computing device 202 can be any computing device such as, but not limited to, a desktop, laptop or tablet computer, personal computer, wearable computer, server, personal digital assistant (PDA), hybrid PDA/mobile phone, mobile phone, electronic book reader, set top box, voice command device, camera, digital media player, and the like. As described herein, the computing device 202 may seek to perform actions on the network-based service 204 (e.g., create an object-based storage bucket, create a table, modify a storage bucket, etc.). Moreover, to gain access to the network-based service 204 and establish a type of account (e.g., standard or special), a user of the computing device 202 may utilize the account manager 106 to create and maintain a network-based services account.

The account manager 106 can allow the user of a computing device 202 to create and maintain an account, with an account type, for the network-based service 204. For example, the user of a computing device 202 may create an account with the account manager 106 for access to the network-based service 204 and select either an account type of standard or special (e.g., designated as a "Standard" or "Special" in FIG. 2). As described herein, when setting an account type to standard, the user operating the computing device 202 under the associated account may have constraints on actions performed or executed in the network-based service 204 (e.g., production deletion constraints that don't allow deletion of an object immediately for many reasons such as a cool-down period, etc.). Moreover, when setting an account type to special, the user of the computing device 202 may be able to selectively bypass, or add, constraints on actions performed or executed on the network-based service 204 (e.g., no wait time or cool down period before an object is fully deleted, no requirement that an object storage bucket is fully empty before deleting the object storage bucket, etc.). Moreover, the account manager 106 may store the account type as a field and the values of that field as metadata or other account data (e.g., at least the value of "standard" or "special" as metadata). For example, the account manager 106 may store the value of the account type along with other account values related to the user of the network-based service 204 (e.g., store account type along with access type of administrator or non-administrator, etc.). However, not being limited to storing the account type as a field, or metadata, other methods of storing or referencing the account type may be implemented. In some embodiments, the account manager 106 may decorate or otherwise augment an account name to include or append an indicator indicating the account type. For example, a user decides to make an account with a name "Account1" and designates such account as "special." The account manager 106 creates the full account name that is decorated or otherwise augmented with account type indicator data, such as "Account1-SP" where the "-SP" designates that the account is a "special" account, or alternatively "-ST" appended at the end of an account to mean an account type of standard).

The account manager 106 can also be in communication with the network-based service 204 regarding actions taken by the user of the computing device 202. For example, when an account is created for the network-based service 204 via the account manager 106 or when a user associated with an account initiates an action on the network-based service 204, the account manager 106 can communicate the account name and account type of the user of the computing device 202, among other account information, to the network-based service 204. In this example, the network-based service 204 may receive the account and account type information and selectively enforce or bypass object creation constraints (or other actions associated with the account) based on the account type (e.g., standard or special) of the user initiating such action. In another example, when the user of the computing device 202 seeks to perform an object deletion (or other actions associated with the account) on the network-based service 204, the account manager 106 may communicate the account and the account type to the network-based service 204 such that the network-based service 204 may determine whether to selectively enforce or bypass constraints on the object deletion based on the account type (e.g., standard or special).

The network-based service 204 may receive actions from the user of the computing device 202, account and account type associated with the user for the network-based services from the account manager 106, and determine whether to selectively enforce, add, or bypass/relax constraints on those actions. For example, the network-based service 204 may store a version of the value of the account type in its own data store (e.g., other storage method, or append designation of account type on the name of the account), or alternatively, request or retrieve the account type of the user when the user attempts to perform an action against the network-based service 204. When the user attempts to perform an action, the network-based service 204 may retrieve or receive the account type (or look for a designation on the account name itself) from the account manager 106 and selectively enforce, add, or bypass constraint on actions. If the network-based service 204 previously stored the account type of the user, it may access its cached version of that value and enforce or bypass constraints on actions (e.g., assuming that there have been no changes to the account type).

As shown in FIG. 1, examples [A], [B], [C], and [D] illustrate how constraints may be utilized by the network-based service 204 based on account type. As shown in example [A], at [A1] a user of a computing device 202 attempts to create a data object 1 (e.g., storage bucket, AI model, database, etc.) on a network-based service 204 using the Account1 account. At [A2], the network-based service 204 may authorize and authenticate Account1 to perform this action (data object creation) by requesting or receiving account information of Account1, from the account manager 106, which can include account type among other information (e.g., other information such as whether Account1 is an administrator account and what data Account1 has access to). As stated above, the account type may additionally be indicated by the account manager 106 passing a field with a value (e.g., of "standard" or "special") to the network-based service 204. Alternatively, the account name itself may be augmented with an account type indicator data (e.g., Account1 as "Account1-ST" for standard or "Account1-SP" for special) and communicated from the account manager 106 to the network-based service 204. The network-based service 204 uses the account information retrieved or received via [A2] to determine that Account1 has an account type of standard. At [A3], based on this determination, the network-based service 204 can create the data object 1 while enforcing constraints (e.g., for creating an AI data object model, at least one AI algorithm must be selected) that are associated with this type of data object creation.

As shown in example [B], at [B1] the user at the computing device 202 operating under Account1 attempts to delete the data object 1 (e.g., storage bucket, AI model, database, etc.). At [B2], the network-based service 204 may authorize and authenticate Account1 to perform this action (data object deletion) by requesting or receiving account information, from the account manager 106, which can include account type, among other information (e.g., other information such as whether Account1 is an administrator account and what data Account1 has access to). The network-based service 204 uses the account information received via [B2] to determine that Account1 has an account type of standard. At [B3], by determining that the account type of the user deleting data object 1 is standard, the network-based service 204 may enforce the production deletion constraints (on the data object) of wait time 210, auditing 212, and encryption 214. In example [B], the wait time 210 constraint may ensure that there is a period of time that elapses (e.g., 48 hours) before data object 1 can be fully deleted and another data object with the same name can be recreated. Thus, the deletion may be a "soft" deletion in which data object 1 is marked as deleted in a listing or index (e.g., using a "tombstone" record indicating the date and time of deletion), rather than being physically deleted from storage. After expiration of the period of time, the object may be physically deleted from storage, a record identifying the object may be removed from an object listing or index, etc. Also shown in example [B], the auditing 212 constraint may ensure that there are no auditing requirements that have to be satisfied (e.g., data object 1 does not contain any data that needs to be held for auditing reasons such as accounting or tax purposes) regarding the data object 1, prior to it being deleted. Additionally shown in example [B], the encryption 214 constraint may stop the data object 1 from being deleted if it is an encryption key (e.g., don't allow deletion of the data object 1 if it is an encryption key and other services are using this key to encrypt or decrypt data, because data using the data object 1 should be re-keyed to another encryption key before the data object is deleted). At [B4], assuming there are no remaining constraints to be satisfied, the data object 1 may be deleted (e.g., if data object 1 was a storage bucket, it would be deleted). As seen from this example, a user who wants to quickly delete data object 1 may run into some hurdles do to production related constraints.

Still referring to FIG. 1, as shown in example [C], at [C1] a different user at a computing device 202 attempts to create a data object 2 (e.g., storage bucket, AI model, database, etc.) in the network-based service 204 using a different account than used in the examples above: in this example, the Account2 account. At [C2], the network-based service 204 (e.g., the same network-based service 204 as in the examples above) may authorize and authenticate Account2 to perform this action (data object creation) by requesting or receiving account information, from the account manager 106, which can include account type among other information (e.g., other information such as whether Account2 is an non-administrator or "user" account and what data Account2 has access to). The network-based service 204 can use the account information retrieved or received via [C2] to determine that Account2 has an account type of special. As described elsewhere herein, designating an account with an account type of special can mean that the user would like constraints for network-based service actions to be relaxed or bypassed (e.g., production constraints don't apply, thus allowing certain actions such as deletions and modifications to happen more quickly, etc.). At [C3], based on this determination, the network-based service 204 can create the data object 2 while bypassing constraints that are associated with this type of data object creation (e.g., for creating an AI data object model, the constraint may require at least one AI algorithm to be selected before creation, is bypassed).

Still referring to FIG. 1, as shown in example [D], the user using Account2 at the computing device 202 attempts to delete the data object 2 (e.g., storage bucket, AI model, database, encryption keys, etc.). At [D2], the network-based service 204 may authorize and authenticate Account2 to perform this action (data object deletion) by requesting or receiving account information, from the account manager 106, which can include account type, among other information. The network-based service 204 uses the account information received via [D2] to determine that Account2 has an account type of special. At [D3], by determining that the account type of data object 2 is special, the network-based service 204 can selectively bypass the production deletion constraints (e.g., no constraints of wait time 210, auditing 212, and encryption 214).

Additionally or alternatively, the network-based service 204 may add additional constraints specific to special account types which are not applied to standard account types. For example, some customers of the network-based service 204 may want to experience certain network-based service errors or conditions (e.g., network throttling sooner, service/server/resource failures at a higher rate than with a standard account type, or a higher mean time to failure (MTTF) than with a standard account type) more often or more quickly than if the account type was standard. These customers may want to experience such errors or conditions for development or testing purposes so that that they can write or debug code or design their network-based services in a more robust manner prior to creating an account with an account type of standard (e.g., with normal production constraints). Letting customers experience these conditions or errors more often or more quickly may be advantageous because experiencing the conditions or constraints first-hand may let the customers design more robust implementations of network-based services than otherwise.

At [D4], the data object 2 may be deleted with selective or no constraints, or with constraints not applied to an account type of standard. As such, in this example, versus example [B], the deletion of the data object 2 may be performed more quickly than the deletion of the data object 1 because there are no deletion constraints. As seen from this example, by having an account type of special, actions performed on network-based services may be completed without the hurdles of constraints (e.g., no cool-down period, policy restrictions, empty storage unit requirements, etc.).

Example Routine

Figure 3:
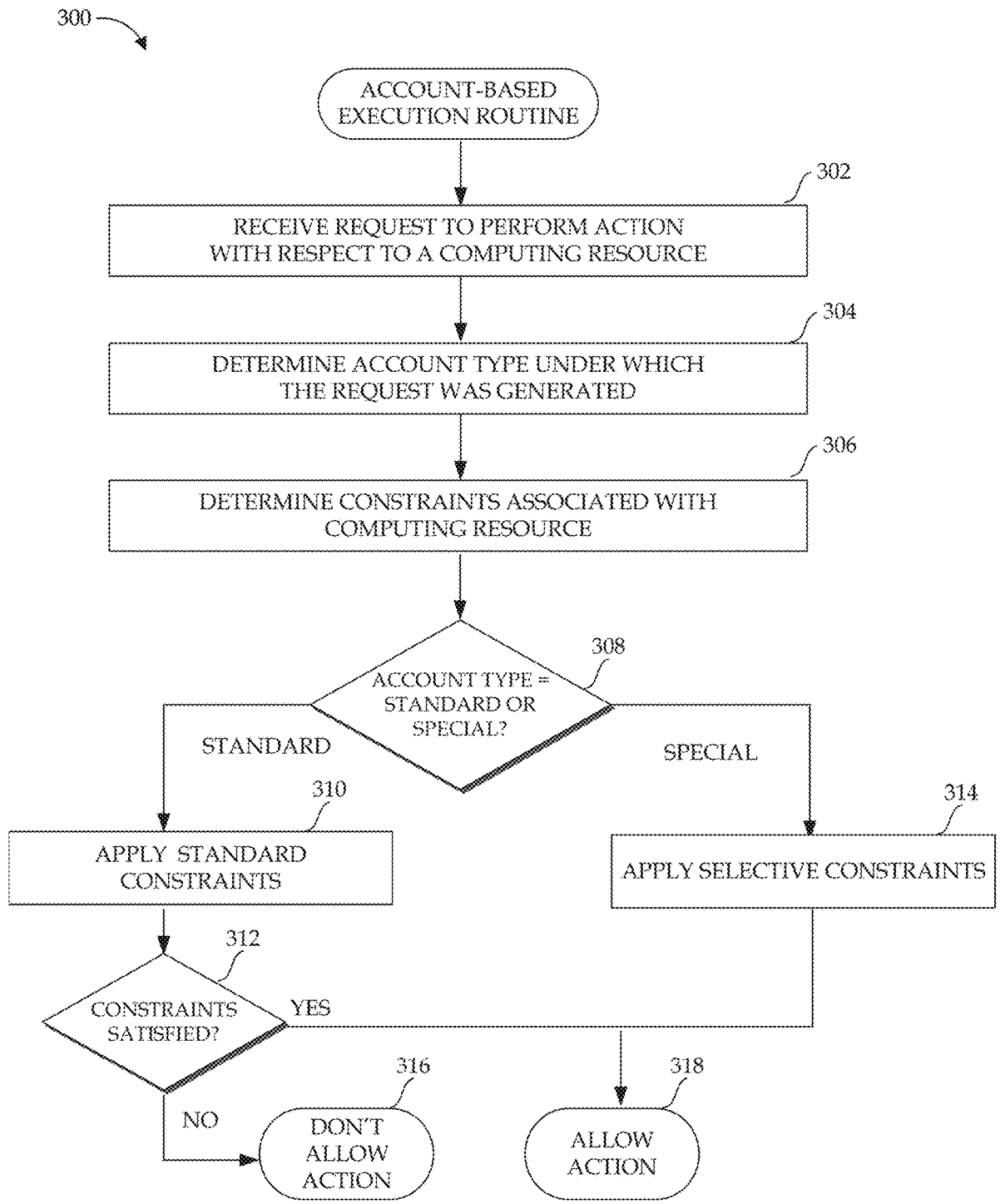
FIG. 3 is a flow diagram of an illustrative routine for a network-based service to determine, based on the account type assigned to an account under which a user is operating or under which an action is otherwise initiated, whether to enforce, relax, or bypass altogether constraints on the action.

FIG. 3 illustrates an example account based routine 300 for a network-based service to determine, based on the account type assigned to an account under which a user is operating or under which an action is otherwise initiated, whether to enforce, relax, or bypass altogether constraints on the action.

At block 302, the network-based service 204 receives a request to perform an action with respect to a computing resource (e.g., network-based storage, network-based analytics, network-based AI, network-based databases, etc.) associated with it. For example, the action may be to create or delete a network-based storage bucket.

In some embodiments, the action may be to provision or otherwise affect multiple network-based services based on a script or template, or the action may be a single action of such a script or template. For example, a user such as a system developer or engineer may wish to test deployment of a new region of the cloud provider network 100, or a network-based service or set of services within a region of the cloud provider network 100. To do so, a series of actions may be performed in which objects are created and modified, and results of the actions may be evaluated to determine whether performance criteria are satisfied, whether changes are to be made, etc. The user may wish to implement changes and re-build the region or re-deploy services therein to continue testing. Imposition of constraints on certain actions may impede such testing by causing delays, requiring additional operations, and the like. Advantageously, by using a "special" or "test" account type and selectively relaxing or bypassing constraints based on use of such an account type, the affected network-based services can facilitate such re-build, re-deploy, and testing operations in a time-efficient and resource-efficient manner.

At block 304, the network-based service 204 may determine the account type associated with an account under which the request was generated or the action was otherwise initiated. As described herein, the network-based service 204 may retrieve or receive account information from the account manager 106 regarding the account of the user which initiated the request for the action. After receiving the account information from the account manager 106, the network-based service 204 may determine the account type (e.g., as metadata, as a field value, appended to an account name as a decoration, etc.) associated with the account of the user that initiated the action, and whether that account type is standard or special.

At block 306, the network-based service 204 determines constraints associated with the computing resource. As stated, constraints on actions can prevent actions to be performed on network-based services if the constraints are not satisfied. For example, there may be a data object creation, deletion, or modification quota constraint that limits the amount of data objects that can be created, deleted, or modified during a period (e.g., a set number of deletions/creations/modifications over days, weeks, months, etc.). As another example, there may be constraints on deleting storage buckets (e.g., the bucket must be empty, there should be no access references to the bucket, etc.). As a further example, there may be constraints on re-creating objects (e.g., an object with a name that is identical to a previously-deleted object may not be created until a threshold period of time has passed from the deletion event).

At decision diamond 308, the network-based service 204 determines whether to selectively apply, add, or bypass constraints based on the account type associated with the account of the user which requested the action. At block 310, if the network-based service 204 determines that the account type is standard, then constraints can be applied to the action on the computing resource. As an example, if the action against the computing resource is to delete a storage bucket, then such bucket may not be deleted until the bucket is empty. As another example, there may be throttling deletion constraints on data objects such as auditing constraints (e.g., certain data can't be deleted for legal reasons), deletion quota constraints (e.g., limited amounts of data objects may be deleted during a period), soft deletion constraints (e.g., deletion action is performed but data object is marked as inactive and can be reactivated at a later time). As another example, there may be modification constraints that restrict modification of a data object (e.g., a constraint not allowing a modification of a field value by any user—including administrators—because another network-based service is using or relying on that field value).

At decision diamond 312, if the constraints from block 310 were not satisfied, then the network-based service 204 proceeds to block 316 and does not allow the action to be performed with respect to the computing resource. For example, the action may have been to delete a storage bucket, the constraint may have required an empty storage bucket prior to deletion, and the storage bucket to be deleted may have had a storage object in it. In this example, a user executing this action can be substantially delayed from attempting to accomplish this action (e.g., the user has to go back to the bucket and make sure it's empty before trying to delete it again, among other constraints). As another example, the action may have been to create an AI model with a certain name (e.g., model1), the constraint may have required that there be no prior AI models with the same name is currently under a soft delete (e.g., AI model was deleted by a user but the AI model is marked as inactive where the AI model may be reactivated at a later time so not fully deleted from the system), and there is a prior AI model with the same name is currently under a soft delete. In this example, a user executing this action may not be allowed to perform the AI model creation due to the soft deletion constraint. Still at decision diamond 312, if the constraints were satisfied, the routine proceeds to block 318, and the action on the computing resource is allowed.

At block 314, if the network-based service 204 determines that the account type is special, then the network-based service 204 applies selective constraints on the action (e.g., bypass all production constraints but adds a special constraint). At block 318, once bypassing or adding the constraints, the network-based service 204 can allow the action to be performed on the computing resource of the network-based service 204.

Although FIG. 3 shows the request to perform an action on a computing resource occurring prior to the determination of account type, the ordering is presented for purposes of illustration only and is not meant to be limiting or required. In some embodiments, the account types may be determined prior to, or in parallel with, the request to perform an action on a computing resource. In addition, although FIG. 3 shows the determination of constraints at block 306 occurring after determining the account type at block 304, the ordering is presented for purposes of illustration only and is not meant to be limiting or required. In some embodiments, the determination of constraints may be performed prior to, in parallel with, or asynchronously with respect to determining the account type.

Network-Based Services Using Account Type for Constraints

Figure 4:
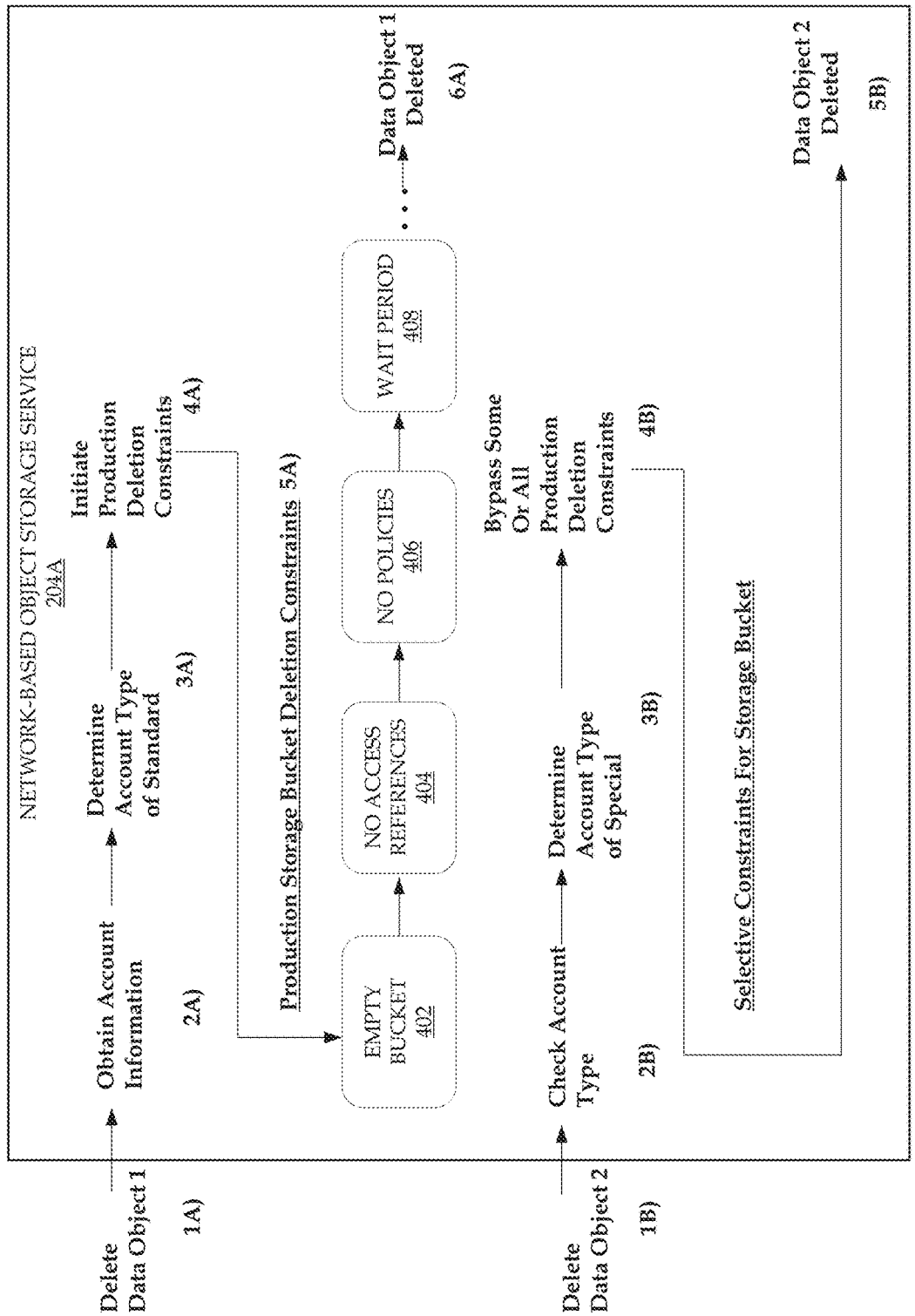
FIG. 4 is a block diagram depicting an example network-based object storage service determining whether to enforce or bypass constraints based on account type.

FIG. 4 illustrates a block diagram depicting an example network-based object storage service determining whether to enforce or bypass constraints based on account type. As shown in FIG. 4, a network-based object storage service 204A receives a request to delete a data object 1 and a data object 2.

Regarding data object 1, at 1A), a computing device 202 can submit a request, under an account, to delete the data object 1 (e.g., storage bucket) on the network-based object storage service 204A. At 2A), the network-based object storage service 204A obtains account information for the account associated with the computing device 202. The network-based object storage service 204A can retrieve or receive the account type from the account manager 106, along with the other account information. At 3A), the network-based object storage service 204A determines that the account type is standard based on the account information from the account manager 106. At 4A), the network-based object storage service 204A initiates production deletion constraints based on determining that the account type to be standard.

At 5A), the production deletion constraints of empty bucket 402, no access references 404, no polices 406, and wait period 408 are initiated and need to be satisfied before the data object 1 can be deleted. For example, the empty bucket 402 constraint may be satisfied when the storage bucket that is data object 1 is empty with no storage items in it. As another example, the no access references 404 constraint may be satisfied when the data object 1 no longer has access references associated with it (e.g., data object 1 has a storage bucket and a constraint for there to be no uniform resource locators (URL) associated with it that would allow someone to access the storage bucket via a URL). In this example, prior to deletion of the data object 1, all access references associated with the data object 1 would have to be deleted. As another example, the no polices 406 constraint may be satisfied when the data object 1 no longer has policies associated with it. In this example, a policy may indicate permissions that different users have for the data object 1 (e.g., if the data object is associated with a storage bucket, a policy on how may modify the bucket, policy on who may delete the bucket, policy on who can view the contents of the bucket, etc.). As such, in this example, prior to deletion of the data object 1, all policies associated with data object 1 would have to be deleted. As another example, the wait period 408 constraint may be satisfied when a threshold period of time has passed since an event associated with the data object (e.g., a deletion or creation event, etc.). In other words, the wait period 408 constraint can be satisfied if there are no longer any time thresholds that have to be met (e.g., must pass a threshold of time, 48 hours for example, after trying a first delete action before trying a second deletion action). In this example, prior to deletion of the data object 1, all wait times associated with data object 1 would have to have elapsed before data object 1 could be deleted. At 6A), once all the constrains are satisfied, the data object 1 may then be deleted.

Regarding data object 2, at 1B), a computing device 202 can submit a request, under an account, to delete the data object 2 (e.g., storage bucket) from the network-based object storage service 204A. At 2B), the network-based object storage service 204A obtains an account type for the account that sent the request or otherwise initiated the action. The network-based object storage service 204A can retrieve or receive the account type from the account manager 106, along with other account information. At 3B), the network-based object storage service 204A determines that the account type is special based on the account information from the account manager 106. At 4B), the network-based object storage service 204A may selectively bypass some or all of the production deletion constraints, or add constraints, based on determining the account type to be special. At 5B), the data object 2 is deleted without any constraints (not having to worry about whether all the constraints have been satisfied) and results in a deletion occurring more quickly and/or with more efficient use of computing resources than in the case for the data object 1.

Figure 5:
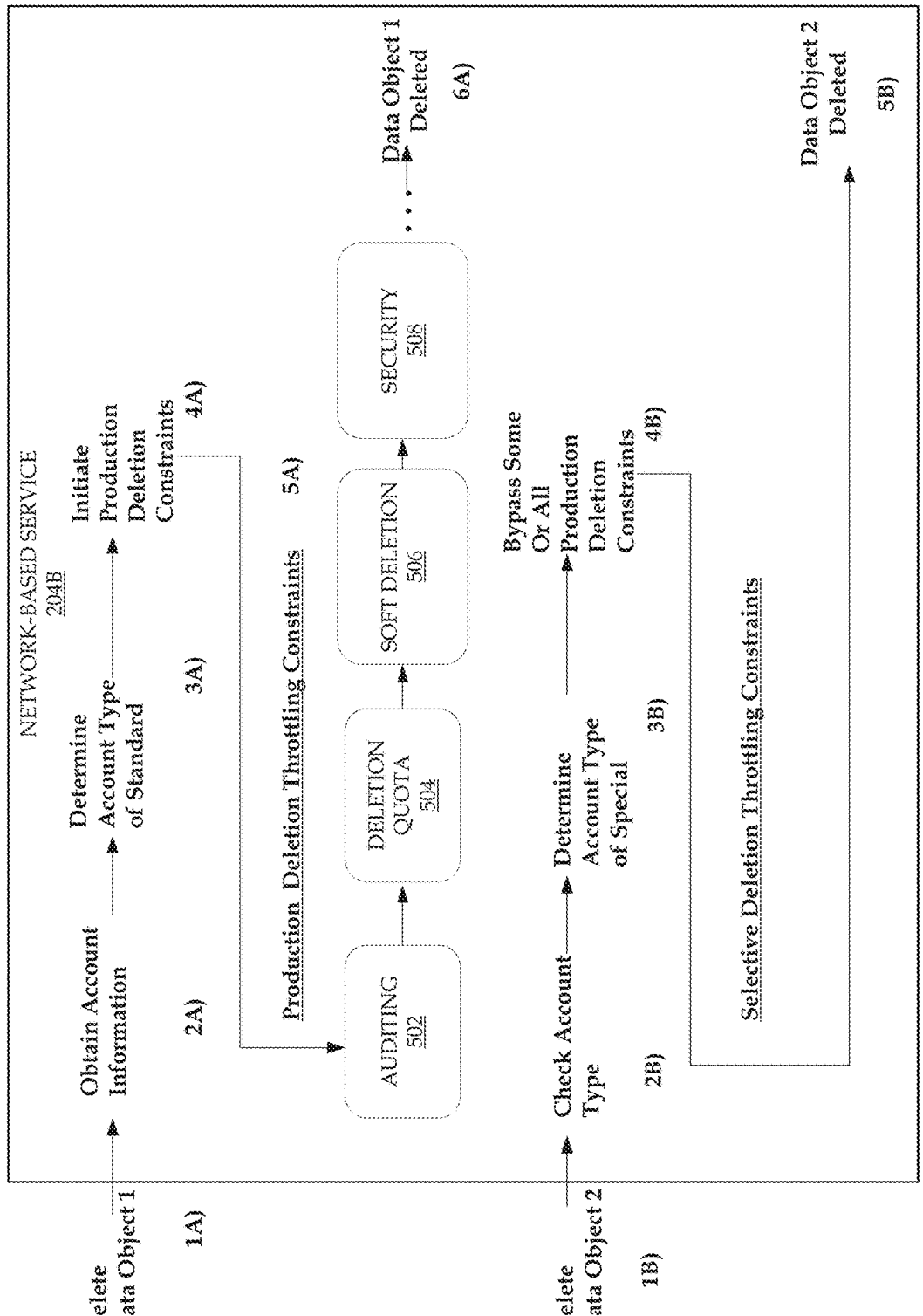
FIG. 5 is a block diagram depicting example network-based services determining whether to enforce or bypass throttling constraints based on account type.

FIG. 5 illustrates a block diagram depicting an example network-based service determining whether to enforce or bypass throttling constraints based on account type. As shown in FIG. 5, the network-based service 204B receives a request to delete a data object 1 and a data object 2.

Regarding data object 1, at 1A), a computing device 202 can submit a request, under an account, to delete the data object 1 (e.g., encryption keys) on the network-based service 204B. At 2A), the network-based service 204B obtains an account type for the account associated with the computing device 202. The network-based service 204B can retrieve or receive the account type from the account manager 106, along with other account information. At 3A), the network-based service 204B determines that the account type is standard based on the account information from the account manager 106. At 4A), the network-based service 204B initiates production deletion throttling constraints based on determining that the account type to be standard.

At 5A), the production deletion throttling constraints of auditing 502, deletion quota 504, soft deletion 506, and security 508 are initiated and need to be satisfied before the data object 1 can be deleted. For example, the auditing 502 constraint may be satisfied when data associated with the data object 1 are no longer required to be kept for auditing reasons (e.g., business data requiring five years of retention for tax reasons is encrypted by the data object 1). In this example, prior to deletion of the data object 1, all auditing constraints associated with data object 1 would have to be satisfied. As another example, the deletion quota 504 constraint may be satisfied when the deletion data object 1 does not trigger a deletion quota rule set in place to stop a certain number of data object deletions over a period of time (e.g., you can only delete 10% of existing data objects within a thirty-day rolling period). As such, in this example, prior to deletion of the data object 1, the network-based service 204B would have to ensure that deleting the data object 1 would not trigger any deletion quotas (e.g., there is currently no deletion quota in place and the deletion of the data object 1 would not cause the deletion quota to be reached). As another example, the soft deletion 506 constraint may be satisfied when the data object 1 is not a data object that requires soft deletions (e.g., a user deletes data object 1 on a user interface (UI) but in a backend database, data object 1 is marked as inactive and can be made active at a later time so the data object 1 is not fully deleted because it is an encryption key which could be used again). In this example, prior to deletion of the data object 1, any soft deletions may not be in place for the data object 1. As another example, the security 508 constraint may be satisfied when the data object 1 is not under any data protection policies. As such, the data object 1 may have to abide by a data protection policy not allowing encryption keys to be deleted while they are still used by other computing resources where the data object 1 is an encryption key and it's used by multiple computing resources. If a network-based object storage service has a bucket that uses the data object 1 (as an encryption key) to encrypt its storage contents, inadvertent deletion of the data object 1 may result in contents of the storage bucket to not be decrypted. Moreover, a network-based AI service may have used the data object 1 (as an encryption key) to encrypt training data, and inadvertent deletion of the data object 1 may result in the training data to not be encrypted. Therefore, prior to deletion of the data object 1, any data protection policies may not be in place on the data object 1. At 6A), once all the constrains are satisfied, the data object 1 may then be deleted.

Regarding data object 2, at 1B), a computing device 202 can submit a request, under an account, to delete the data object 2 (e.g., encryption key) from the network-based service 204B. At 2B), the network-based service 204B obtains an account type for the account associated with the computing device 202. The network-based service 204B can retrieve or receive the account type from the account manager 106, along with other account information. At 3B), the network-based service 204B determines that the account type is special based on the account information from the account manager 106. At 4B), the network-based service 204B may selectively bypass some or all of the production deletion throttling constraints, or add constraints, based on determining the account type to be special. At 5B), the data object 2 is deleted without any constraints (not having to worry about whether all the constraints have been satisfied) and results in a deletion occurring more quickly and/or with more efficient use of computing resources than in the case for the data object 1.

Figure 6:
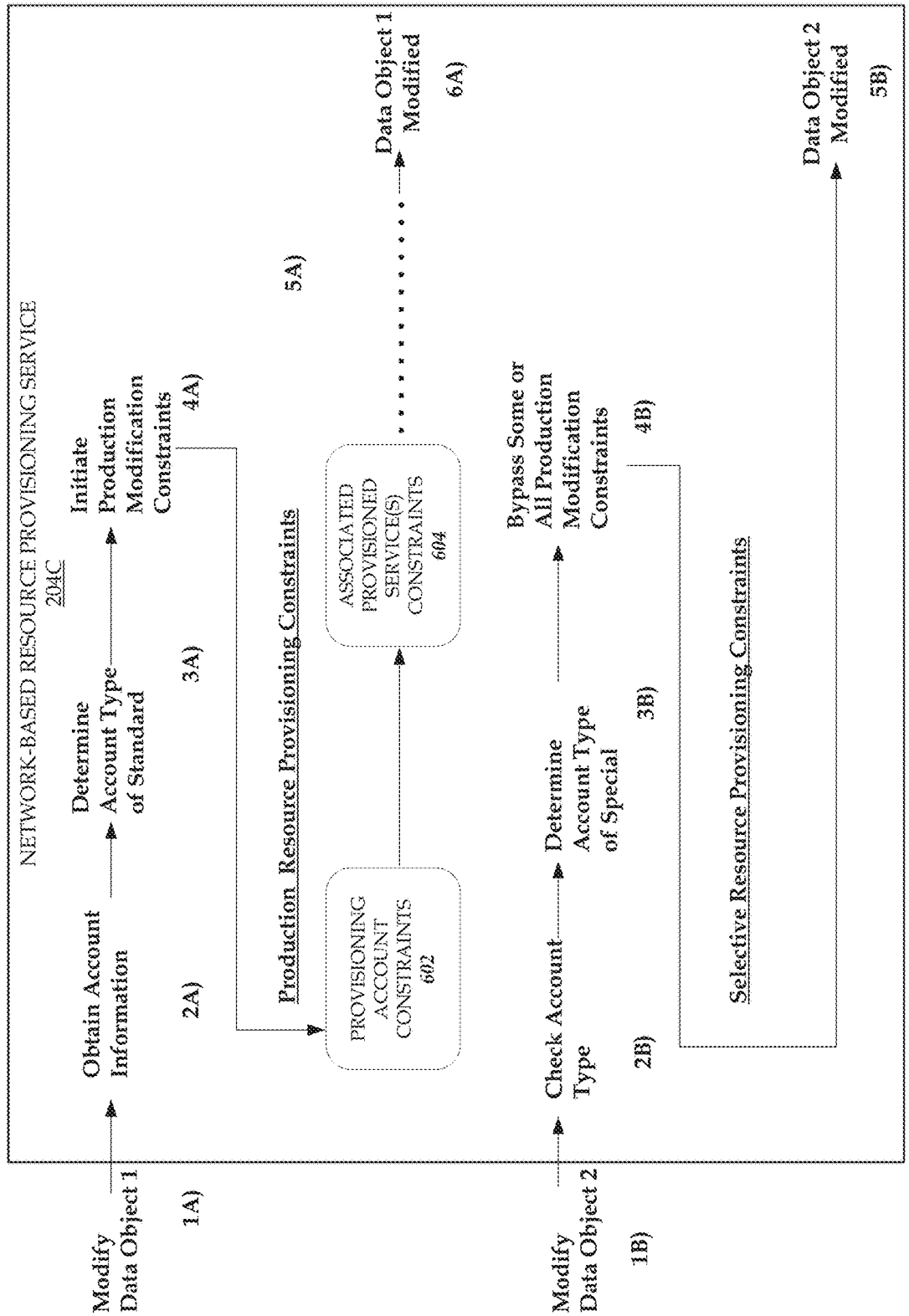
FIG. 6 is a block diagram depicting an example network-based resource provisioning service determining whether to enforce or bypass constraints based on account type.

FIG. 6 illustrates a block diagram depicting an example network-based resource provisioning service that can determine whether to enforce or bypass constraints based on account type. As shown in FIG. 6, a network-based resource provisioning service 204C receives a request to modify a data object 1 and a data object 2. The network-based resource provisioning service 204C can be a service that can execute a template or script to provision network-based services (e.g., run a script to create network-based databases, AI models, storage buckets, analytics models, on-demand code execution systems, etc.). Additionally or alternatively, the network-based resource provisioning service 204C may be implemented as an infrastructure as code (IaC) network-based service that may allow modeling, provisioning, and managing of other network-based services (e.g., network-based databases, AI models, storage buckets, analytics models, on-demand code execution systems, etc.).

Regarding the data object 1, at 1A), a computing device 202 can submit a request, under an account, to modify the data object 1 (e.g., data object 1 is a script or template and the modification is a change to the script or template that provisions network-based services to create 105 new storage buckets and to now provision five types of services [databases, AI models, storage buckets, analytics models, on-demand code execution systems] instead of four previously) on the network-based resource provisioning service 204C. At 2A), the network-based resource provisioning service 204C obtains an account type for the account associated with the computing device 202. The network-based resource provisioning service 204C can retrieve or receive the account type from the account manager 106, along with other account information. At 3A), the network-based resource provisioning service 204C determines that the account type is standard based on the account information from the account manager 106. At 4A), the network-based resource provisioning service 204C initiates production modification constraints based on determining that the account type is standard.

At 5A), the production modification constraints of provisioning account constraints 602 and associated provisioned services constraints 604 are to be satisfied before the data object 1 can be modified. For example, the provisioning account constraints 602 may be satisfied when there are no open restrictions on creating provisioned services (e.g., a constraint as a limit to create no more than four provisioned services at a time). In this example, prior to modification of the data object 1, all open restrictions on creating provisioned services associated with the data object 1 would have to be satisfied. As another example, the provisioned services constraints 604 may be satisfied when constraints associated with each of the provisioned network-based services are also satisfied. In this example, if a script associated with the network-based resource provisioning service 204C provisions a storage bucket to be created and modified against a network-based object storage service that creates the bucket, any constraints associated with the network-based object storage service would also have to be satisfied. As such, in this example, prior to deletion of the data object 1, the network-based resource provisioning service 204B would have to ensure that modifying the data object 1 would not trigger any provisioning account constraints 602 (e.g., the network-based storage service sets a limit on the number of storage buckets that can be provisioned at one time, 100 for example, and a script attempts to provision more than the limit, 105, then this constraint would not be satisfied).

Regarding data object 2, at 1B), a computing device 202 can submit a request, under an account, to modify the data object 2 (e.g., script or template that provisions network-based services) on the network-based resource provisioning service 204C. At 2B), the network-based resource provisioning service 204C obtains an account type for the account associated with the computing device 202. The network-based resource provisioning service 204C can retrieve or receive the account type from the account manager 106, along with other account information. At 3B), the network-based resource provisioning service 204C determines that the account type is special based on the account information from the account manager 106. At 4B), the network-based resource provisioning service 204B may selectively bypass some or all of the production modification constraints, or add constraints, based on determining that the account type to be special. At 5B), the data object 2 is modified without any constraints (not having to worry about whether all the constraints have been satisfied) and results in a modification occurring more quickly and/or with more efficient use of computing resources than in the case for the data object 1.

Example Account Manager System

FIG. 7 illustrates various components of an example account manager 106 configured to implement various functionality described herein.

In some embodiments, as shown, the account manager 106 may include: one or more computer processors 702, such as physical central processing units ("CPUs"); one or more network interfaces 704, such as a network interface cards ("NICs"); one or more computer readable memory 706; and one or more input and output device interfaces 708.

The primary memory 710 may include computer program instructions that one or more computer processors 702 execute and/or data that the one or more computer processors 702 use in order to implement one or more embodiments. For example, the primary memory 710 can store an operating system 712 to provide general administration of the account manager 106. As another example, the primary memory 710 can store account data 714 regarding accounts for use of network-based services. As a further example, the primary memory 710 can store account type indicator data provision instructions 716 for providing account type indicator data information to network-based services.

TERMINOLOGY AND ADDITIONAL CONSIDERATIONS

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    an account manager comprising a first set of one or more computing devices and configured to maintain account data for individual accounts of a plurality of accounts, wherein account data for a particular account represents an account type to which the particular account is assigned, wherein the account type is one of a plurality of account types, and wherein the plurality of account types comprises:
        a production account type subject to data object constraints for mitigation of negative impacts to production workloads from inadvertent actions taken on resources associated with the particular account; and
        a test account type for which at least one of the data object constraints are to be bypassed for efficient testing of resources associated with the particular account; and
    a network-based service comprising a second set of one or more computing devices and configured to:
        receive, from a first computing device, a first request initiated using a first account to execute a first action on the network-based service, wherein execution of the first action under the standard account type is subject to satisfaction of one or more constraints of the data object constraints;
        retrieve, from the account manager, first account data indicating the first account is assigned to the special account type;
        execute the first action to completion without requiring satisfaction of at least one of the one or more constraints based on the first account being assigned to the special account type;
        receive, from a second computing device, a second request initiated using a second account to execute a second action on the network-based service, wherein execution of the second action under the standard account type is subject to satisfaction of the one or more constraints;
        retrieve, from the account manager, second account data indicating the second account is assigned to the standard account type;
        determine that the second action fails to satisfy the one or more constraints; and
        prevent the second action from being fully executed based on the second action failing to satisfy the one or more constraints.

2. The system of claim 1, wherein the network-based service is at least one of: an object-based storage service; an on-demand code execution service; an artificial intelligence service; or a database service.

3. The system of claim 1, wherein the one or more constraints include at least one of a: wait time constraint; auditing constraint; deletion quota constraint; or encryption constraint.

4. The system of claim 1, wherein the first action or the second action is one of a: data object deletion; data object creation; or a data object modification.

5. A computer-implemented method comprising:
under control of one or more computing devices configured to execute specific instructions,
receiving a first request, generated using a first account, to execute an action with respect to a first computing resource of a computing resource type, wherein execution of the action under a standard account type is subject to satisfaction of one or more constraints associated with the computing resource type;
determining that the first account is associated with a special account type;
executing the action with respect to the first computing resource without requiring satisfaction of at least one of the one or more constraints;
receiving a second request, generated using a second account, to execute the action with respect to a second computing resource of the computing resource type;
determining that the second account is associated with the standard account type; and
executing the action with respect to the second computing resource subject to satisfaction of the one or more constraints.

6. The computer-implemented method of claim 5, further comprising receiving, from an account management system, account type data indicating that first account is associated with the special account type, wherein determining that the first account is associated with the special account type is based on the account type data.

7. The computer-implemented method of claim 5, wherein executing the action with respect to the first computing resource comprises executing the action subject to a constraint associated with the special account type, wherein execution of the action under the standard account type is not subject to satisfaction of the constraint associated with the special account type.

8. The computer-implemented method of claim 5, wherein determining that the first account is associated with the special account type is based on an account name of the first account comprising an account type indicator of the special account type.

9. The computer-implemented method of claim 5, wherein executing the action with respect to the first computing resource comprises executing the action as a part of a region build of services of a network-based service.

10. The computer-implemented method of claim 5, wherein executing the action with respect to the first computing resource comprises executing the action as a part of deployment testing on a network-based service.

11. The computer-implemented method of claim 5, wherein the action regarding the second computing resource does not execute to completion based on not satisfying the one or more constraints.

12. The computer-implemented method of claim 5, further comprising evaluating the one or more constraints prior to execution of the action with respect to the second computing resource, wherein the one or more constraints comprise at least one of a: wait time constraint; auditing constraint; deletion quota constraint; or encryption constraint.

13. The computer-implemented method of claim 12, wherein the executing of the action with respect to the second computing resource fails to complete due to a network-based service enforcing one or more constraints, wherein at least one of the one or more constraints were not satisfied.

14. The computer-implemented method of claim 5, wherein executing the action with respect to the first computing resource comprises executing one of a: data object deletion; data object creation; or a data object modification.

15. A system comprising:
computer-readable memory storing executable instructions; and
one or more processors in communication with the computer-readable memory and programmed by the executable instructions to:
receive a first request, generated using a first account, to execute an action with respect to a first computing resource of a computing resource type, wherein execution of the action under a standard account type is subject to satisfaction of one or more constraints associated with the computing resource type;
determine that the first account is associated with a special account type;
execute the action with respect to the first computing resource without requiring satisfaction of at least one the one or more constraints;
receive a second request, generated using a second account, to execute the action with respect to a second computing resource of the computing resource type;
determine that the second account is associated with the standard account type; and
execute the action with respect to the second computing resource subject to satisfaction of the one or more constraints.

16. The system of claim 15, wherein the action with respect to the first computing resource is executed subject to a constraint associated with the special account type, and wherein execution of the action under the standard account type is not subject to the constraint associated with the special account type.

17. The system of claim 15, wherein a value associated with the special account type is saved as a field at an account manager, wherein the value is saved as either special or standard, and wherein the account manager stores and maintains account types.

18. The system of claim 15, wherein the action regarding the second computing resource is to execute a script that provisions data objects at one or more network-based services.

19. The system of claim 18, wherein execution of the action with respect to the second computing resource fails to complete due to a network-based service enforcing one or more constraints, wherein at least one of the one or more constraints were not satisfied.

20. The system of claim 15, wherein the action comprises one of a: data object deletion; data object creation; or a data object modification.

* * * * *

UNITED STATES PATENT AND TRADEMARK OFFICE
CERTIFICATE OF CORRECTION

PATENT NO. : 12,143,280 B1
APPLICATION NO. : 18/459177
DATED : November 12, 2024
INVENTOR(S) : Juan-Pierre Longmore Page 1 of 1

It is certified that error appears in the above-identified patent and that said Letters Patent is hereby corrected as shown below:

In the Specification

Column 12, Line 5, delete "may seck to" and insert -- may seek to --.

Signed and Sealed this
Twenty-eighth Day of January, 2025

Coke Morgan Stewart
*Acting Director of the United States Patent and Trademark Office*